(12) United States Patent
Kim et al.

(10) Patent No.: US 6,734,822 B2
(45) Date of Patent: May 11, 2004

(54) TRANSMISSION SYSTEM AND METHOD ON A FORWARD LINK

(75) Inventors: Jeong Ho Kim, Anyang-shi (KR); Young Jae Kim, Anyang-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/000,443

(22) Filed: Dec. 4, 2001

(65) Prior Publication Data

US 2002/0093454 A1 Jul. 18, 2002

(30) Foreign Application Priority Data

Dec. 6, 2000 (KR) .................................. P2000-73665

(51) Int. Cl.⁷ .................................................. G01S 3/16
(52) U.S. Cl. ........................................ 342/379; 455/501
(58) Field of Search ................................. 342/368–378, 342/379; 455/501

(56) References Cited

U.S. PATENT DOCUMENTS 6,459,687 B1 * 10/2002 Bourlas et al. ............. 370/328
2001/0021182 A1 * 9/2001 Wakutsu ..................... 370/344
2001/0038620 A1 * 11/2001 Stanwood et al. .......... 370/336

OTHER PUBLICATIONS

High throughput slotted ALOHA packet radio networks with adaptive arrays, J. Ward et al, IEEE Transactions on Communications, vol. 41(3), p. 460–470, Mar. 1993.*
Adaptive QoS for mobile multimedia applications using power control and smart antennas, A. Mercado et al., IEEE International Conference on Communications, vol. 1, p. 60–64, Jun. 2000.*
Adaptive QoS for mobile multimedia services over wireless networks, A. Mercado et al., IEEE International Conference on Multimedia and Expo, vol. 1, p. 517–520, Jul.–Aug. 2000.*

* cited by examiner

Primary Examiner—Thomas H. Tarcza
Assistant Examiner—Fred H Mull
(74) Attorney, Agent, or Firm—Fleshner & Kim, LLP

(57) ABSTRACT

The present invention relates to a communication system, and more particularly, to transmission system and method on a forward link in a communication system having a plurality of antenna arrays. In particular, the present invention calculates a weighted vector by using a QoS parameter of respective subscriber, for applying to a transmission signal.

33 Claims, 2 Drawing Sheets

TRANSMISSION SYSTEM AND METHOD ON A FORWARD LINK

BACKGROUND OF THE INVENTION

1. Field of the Invention

The present invention relates to a communication system, and more particularly, to transmission system and method on a forward link in a communication system having a plurality of antenna arrays.

2. Background of the Related Art

In wireless communications, a desired signal (hereafter called an "original signal"), is received together with, in general, multiple interference signals. The level of distortion in a received signal caused by the interference signals is dependent on the ratio of power in the original signal to a sum of powers of the interference signals. Thus, where there are many interference signals, communication distortion occurs even if the power level of the original signal is substantially higher than individual levels of the interference signals.

Accordingly, a related art cellular communication system places emphasis on minimizing the interference signals, for example by using smart antennas. Thus, when a mobile terminal is in motion, or when an angle of reception at the mobile terminal otherwise varies, the mobile terminal may use an array of antenna elements to control phases of the array of antenna elements for detecting positions of distant signal sources. This approach enables selective transmission/reception of signals to/from the signal sources, selective transmission/reception of a particular signal (the original signal), and substantial reduction of interferences by minimizing influences from the interference signals.

FIG. 1 illustrates a related art transmission system with switching beam array antennas on a forward link. The related art transmission system is provided with a weighted vector storing part 101 for storing weighted vectors to produce a few fixed beams, a beam selector 102 for selecting a weighted vector from the stored weighted vectors and for providing the weighted vector to a beam former 103, and a beam former 103 for subjecting the weighted vector and a signal to be transmitted to a complex internal beam-forming process.

The communication system of the related art has many problems. For example, when one of the weighted vectors stored in the weighted vector storing part 101 for producing fixed beams is selected by the beam selector 102, and provided to the beam former 103 on a reverse link, the beam former 103 subjects the weighted vector and a signal to be transmitted to the complex internal beam forming process to produce and transmit an optimal beam on the forward link.

In application of the switching beam arrays to a TDD (Time Division Duplex) type mobile communication system, channel information obtained at a reverse link is applicable to a forward link, and a weighted vector obtained at the reverse link is applicable to the forward link, because a frequency of the reverse link is the same with the frequency of the forward link. However, because the frequency of the reverse link is different from the frequency of the forward link in the FDD (Frequency Division Duplex) type mobile communication system, phase information on the weighted vector are not the same. Therefore, direct application of the weighted vector obtained from the reverse vector to the forward vector will not provide an optimal beam pattern.

Moreover, where the channel environment of the mobile communication system changes rapidly, or when the reception angle of the signal changes rapidly, the related art method of using the switching beam, in which an optimal weighted vector that meets preset references is selected from a limited preset number of weighted vectors for producing a beam, can not provide a maximum gain to the original signal for an incident angle of the received signal. Instead, related art systems may provide too much gain to a noise component, resulting in less than optimal beam formation.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide transmission system and method on a forward link, which can form an optimal beam for varying channel environment in an FDD mode.

Another object of the present invention is to provide a system and method of minimizing noise on a forward link transmission channel.

In order to achieve at least the above-described objects in whole or in part, and in accordance with the purposes of the present invention, as embodied and broadly described, there is provided a communication system, including: a reception angle estimator configured estimate to a reception angle of a received signal; a determining part configured to determine a Quality of Service (QoS) parameter according to a service quality required by a subscriber of the received signal; a weighted vector calculator configured to calculate a weighted vector using the estimated reception angle and the QoS parameter; and a transmitter configured to apply the weighted vector to the signal to be transmitted.

To further achieve at least the above objects in whole or in part and in accordance with the purpose of the present invention, there is provided a method of transmitting a signal in a communication system, including: estimating a reception angle of a transmitted signal; determining a QoS parameter of the received signal; calculating a weighted vector using the estimated reception angle and the QoS parameter; and applying the calculated weighted vector to a signal to be transmitted.

To further achieve at least the above objects in whole or in part and in accordance with the purpose of the present invention, there is provided a method of transmitting a signal from a noise station, including: estimating a reception angle of a received signal from a first subscriber; determining a Quality of Service (QoS) parameter for the first subscriber; transmitting a transmission signal to the first subscriber by maximizing a gain in a desired signal direction and minimizing a gain in an interference signal direction in accordance with the estimated reception angle and the QoS parameter.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

Figure 1:
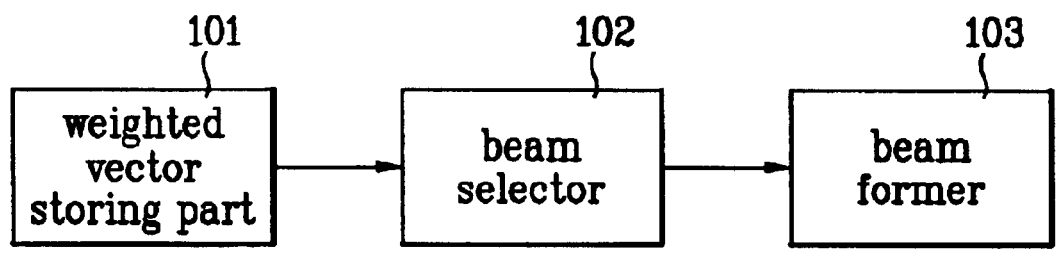
FIG. 1 is a block diagram of a related art transmission system with switching beam array antennas on a forward link.
Figure 2:
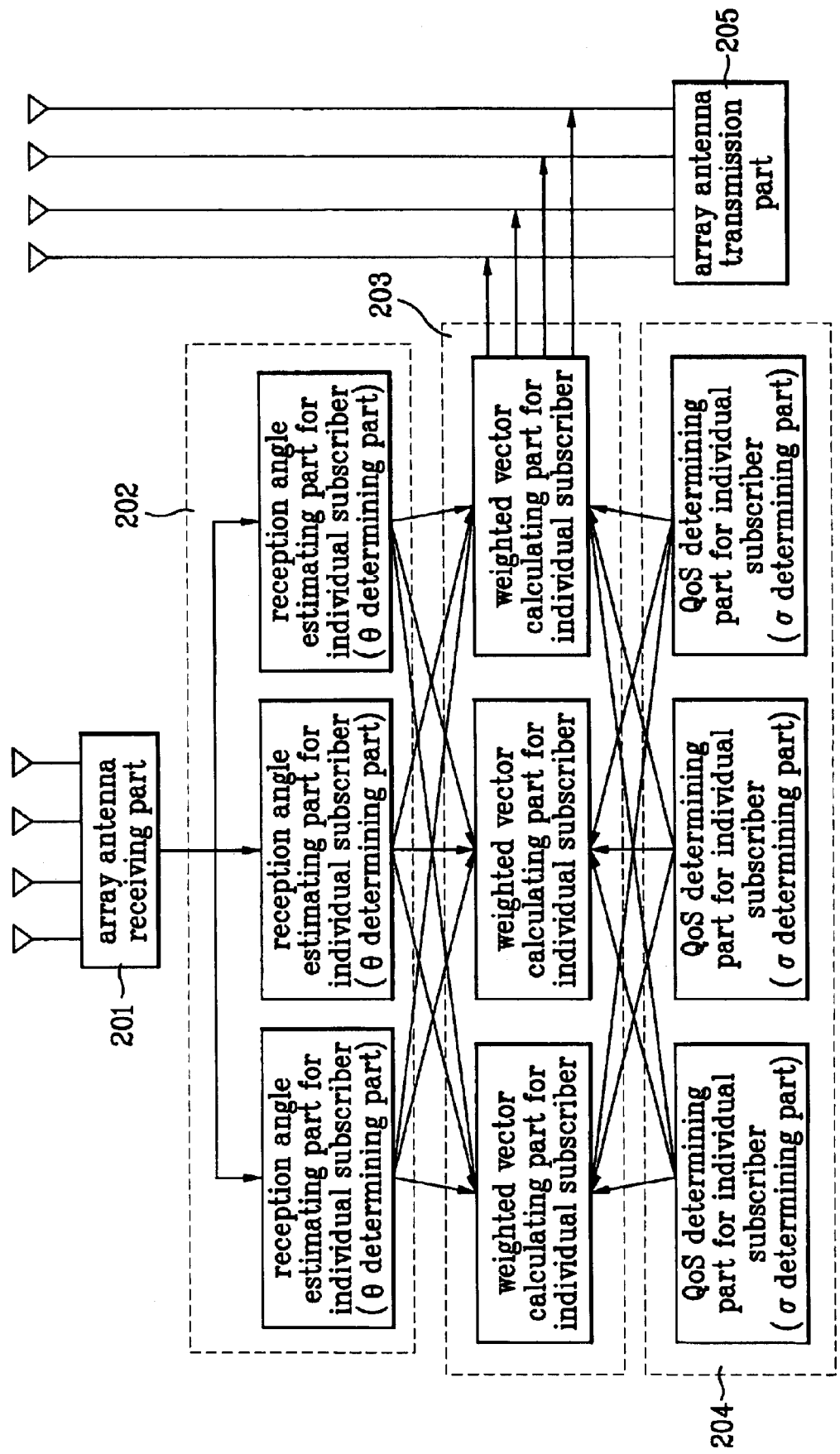
FIG. 2 is a block diagram of a transmission system with adaptive array antennas on a forward link in accordance with a preferred embodiment of the present invention.

FIG. 2 illustrates a transmission system with adaptive array antennas on a forward link in accordance with a preferred embodiment of the present invention. A transmission system with adaptive array antennas in accordance with a preferred embodiment of the present invention preferably includes an array antenna receiving part 201, a reception angle estimating part 202, a weighted vector calculating part 203, a quality determining part 204, and an array antenna transmitting part 205.

The array antenna receiving part 201 may receive an external signal. The reception angle estimating part 202 may estimate reception angles $\theta_i$ of respective subscribers by using the signal received at the array antenna receiving part 201. The weighted vector calculating part 203 may be provided with estimation information on reception angles $\theta_i$ of respective subscribers, and may calculate a weighted vector that maximizes the gain of signal for each subscriber. The quality determining part 204 may determine a parameter "$\sigma$" which forms a null beam in signal directions of other subscribers that require a high Quality of Service (QoS), and may provide "$\sigma$" to the weighted vector determining part 203.

In a preferred embodiment, the foregoing system preferably forms a beam on the forward link according the following procedure. Upon reception of a signal at the array antenna receiving part 201 through the reverse link, the signal may be provided to the reception angle estimating part 202. The reception angle estimating part 202 may then estimate reception angles of signals for respective subscribers, for example by using a widely known algorithm, such as Multiple Signal Classification (MUSIC) or Estimation of Signal Parameters Using Rotational Invariance Techniques (ESPRIT).

In the MUSIC algorithm, for instance, an autocorrelation matrix may be obtained from signal vectors of the antenna array containing angle information on a demodulated space for estimating interferences, and further containing directions of noise signals of a demodulated signal. The autocorrelation matrix may be subjected to eigen decomposition to separate an autocorrelation of a desired signal, and an autocorrelation of an interference and noise signal.

After separating the autocorrelation of the received signal vector into a desired signal component and a noise signal component, a spatial spectrum of the interference and noise signal may be calculated from a sum of eigen vectors of the interference and noise signal, and a reception angle of a signal may be estimated from a maximum value of the spatial spectrum.

The estimated reception angle $\theta_i$ of the received signal may be provided to the weighted vector calculating part 203 for each of the subscribers. The estimated reception angle $\theta_i$ of the received signal for each of the subscribers may be provided to the weighted vector calculating part 203, together with the parameter "$\sigma$" from the quality determining part 204, for calculating an optimal weighted vector for each of the subscribers.

The calculated weighted vector may be given a gain relatively greater than other signals in a desired signal direction, and only a small gain in a direction of the interference signal, or the noise signal. Thus, signal power may be reduced in the interference signal direction.

The optimal weighted vector may be calculated by the following equation (1) the weighted vector calculating part 203.

$$\underline{w} = \left| \sum_{k=1}^{K} \sigma_k \cdot \underline{a}(\theta_k)\underline{a}(\theta_k)^H + 1 \right|^{-1} \cdot \left| \sum_{i=1}^{L} \underline{a}(\theta_i) \right| \tag{1}$$

As used in equation (1), 'K' denotes a number of directions in which null or small gains are desired, and 'L' denotes a number of directions in which maximum gains (or main lobes) are desired. The $\sigma_k$ is a parameter assigned according to a QoS from a specific subscriber, which is regulated in comparison to a communication quality at the system.

In equation (1), the number of directions in which null or small gains are desired is a number of undesired subscriber signal vectors, and the number of directions in which maximum gains (or main lobes) are desired is a number of signal vectors of subscriber signals. The desired, or undesired number of signal vectors may differ depending upon the system environment.

Thus the present invention may provide null or small gain in the interference signal and noise signal direction $\theta_k$, and a large gain in the desired signal direction $\theta_i$. Positions of nulls and main lobes can be regulated as the system requires. Therefore, in order to provide nulls in directions of other subscribers who require high QoS, i.e., in order to form beams having nulls, or small gains in direction vectors of signals containing interference signals or noise signals, a large $\sigma_k$ is assigned, and applied. 'H' in equation (1) denotes a Hermitian operator.

The $\underline{a}(\theta_i)$ in equation (1) may be calculated from the estimated reception angle information $\theta_i$. The $\underline{a}(\theta_i)$ denotes a vector of a reception signal in $a(\theta_i)$ direction. If the antenna has a uniform linear array (ULA) at half wavelength intervals, the $\underline{a}(\theta_i)$ can be calculated as in the following equation.

$$\underline{a}(\theta_i) = [1, \exp(-j \cdot \pi \sin \theta_i), \exp(-j \cdot 2\pi \sin \theta_i), \exp(-j \cdot 3\pi \sin \theta_i), \ldots , \exp(-j \cdot (N-1)\pi \sin \theta_i)]^T \tag{2}$$

Where 'N' denotes a number of antennas in the array, and 'T' denotes a transpose operator.

In general, the direction vector $\underline{a}(\theta_i)$ of the reception signal may be obtained according to the following method. For an example, when it is assumed that a vector of the reception signal received at the antenna array is $\underline{x}$, an autocorrelation matrix of the vector of the reception signal can be expressed by the following equation (3).

$$R_x = fR_x(k-1) + \underline{x}(k)\underline{x}(k)^H \tag{3}$$

Where 'k' denotes a snap shot index for sampling a signal received at the antenna array, and 'f' denotes a forgetting factor with a value between 0 and 1.

Therefore, the direction vector $\underline{a}(\theta_i)$ of the reception signal can be in general obtained by using the "Power Method", that can be summarized as follows.

$$c_{m+1} = \frac{R_x c_m}{|R_x c_m|} \quad (4)$$

$$\lim_{m \to \infty} c_{m+1} = \underline{a} \quad (5)$$

Where 'm' denotes a renewal index for renewing an algorithm, and an initial value of $c_m$, i.e., $c_0$ is set as desired.

In equations (4), and (5), $c_{m+1}$, may be obtained by dividing a multiplication of the autocorrelation matrix of the reception vector and $c_m$ with an absolute value of the multiplication, which converges to a direction vector '$\underline{a}$' of the source signal when the renewal index 'm' diverges to infinite.

The communication system of the preferred embodiment of the present invention has many advantages. For example, the weighted vector obtainable at the weighted vector calculating part 203 can make signals have a null or small gain in directions of an interference signal $\theta_k$ and an Additive White Gaussion Noise (AWGN) I, and a maximum gain in a desired signal direction $\theta_i$. That is, the system can adjust positions, or number of a plurality of nulls, and main lobes according to system requirements or the QoS respective users. Thus, the transmission system and method on a forward link of the preferred embodiment can calculate weighted vectors that provide null or small gains to signals other than a source signal, by applying parameters $\sigma_k$ according to not only reception angles $\theta_i$ of received signals, but also a QoS for particular subscribers.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A communication system, comprising:
   a reception angle estimator configured to estimate a reception angle of a received signal;
   a determining part configured to determine a forward link Quality of Service (QoS) parameter according to a required service quality;
   a weighted vector calculator configured to calculate a weighted vector using the estimated reception angle and the forward link QoS parameter; and
   a transmitter configured to apply the weighted vector to the signal to be transmitted.

2. The system of claim 1, wherein the forward link QoS parameter is determined in accordance with a QoS required for a subscriber generating the received signal.

3. The system of claim 2, wherein the forward link QoS parameter is allocated such that an undesired signal has a gain smaller than a desired signal.

4. The system of claim 3, wherein the forward link QoS parameter is adjusted by comparing respective subscriber QoS to a communication quality.

5. The system of claim 1, wherein the weighted vector is calculated by changing a number of signal vectors corresponding to undesired signals and desired signals.

6. The system of claim 5, wherein the weighted vector determines a gain by applying the forward link QoS parameter to the signal vector for the undesired signal.

7. The system of claim 6, wherein the weighted vector determines a gain by applying the forward link QoS parameter and a direction component of the estimated reception angle of the received signal to signal vectors of undesired signals.

8. The system of claim 5, wherein the undesired signal is at least one of a noise signal and signals of undesired subscribers.

9. The system of claim 1, wherein the weighted vector determines a transmission gain by applying a direction component of the estimated reception angle of the received signal.

10. The system of claim 1, wherein the weighted vector is calculated by generating at least one signal vector for forming nulls, and at least one signal vector for forming a main lobe.

11. The system of claim 10, wherein the at least one signal vector for forming nulls is a signal vector from at least one undesired signal.

12. The system of claim 10, wherein the at least one signal vector for forming a main lobe is a signal vector from a desired signal.

13. The system of claim 10, wherein the at least one signal vector for forming nulls and the at least one signal vector for forming a main lobe have directions that vary with a system environment and the forward link QoS for each subscriber.

14. The system of claim 1, wherein the weighted vector is calculated by an equation, $$\underline{w} = \left[ \sum_{k=1}^{K} \sigma_k \underline{a}(\theta_k) \underline{a}(\theta_k)^H \right]^{-1} E \left[ \sum_{i=1}^{L} \underline{a}(\theta_i) \right],$$

where 'q' denotes the reception angle, 's' denotes the QoS parameter, $\underline{a}(q)$ denotes a direction vector of the received signal, 'I' denotes a size of a noise signal, 'K' denotes a number of directions in which null or small gains are desired, 'L' denotes a number of directions for desired signals, and 'H' denotes a Hermitian operator.

15. The system of claim 1, wherein the communication system is a frequency division duplex communication system.

16. The system of claim 1, wherein the weighted vector calculator is configured to calculate a weighted vector that maximizes a gain of a first signal and minimizes a gain of at least one second signal.

17. The system of claim 16, wherein the first signal is a desired transmission signal and the at least one second signal is a noise signal.

18. The system of claim 17, wherein the noise signal is at least one of white noise and an undesired subscriber signal.

19. The system of claim 1, wherein the forward link QoS parameter is allocated such that an undesired signal has a gain smaller than a desired signal.

20. A method of transmitting a signal in a communication system, comprising:
   estimating a reception angle of a received signal;
   determining a forward link QoS parameter of the received signal;
   calculating a weighted vector using the estimated reception angle and the forward link QoS parameter; and
   applying the calculated weighted vector to a signal to be transmitted.

21. The method of claim 20, wherein the forward link QoS parameter is determined in accordance with a QoS required for a subscriber.

22. The method of claim 21, wherein the forward link QoS parameter allocates a relatively large value such that an undesired signal has a gain smaller than a desired signal.

23. The method of claim 22, wherein the forward link QoS parameter value is adjusted by comparing respective QoS parameters to a communication quality.

24. The method of claim 20, wherein the weighted vector is calculated by generating a number of signal vectors of undesired signals and desired signals.

25. The method of claim 24, wherein the weighted vector determines a forward link gain by applying the forward link QoS parameter to the signal vector for the undesired signals.

26. The method of claim 25, wherein the weighted vector determines the forward link gain by applying the forward link QoS parameter and a direction component of the estimated reception angle of the received signal to the signal vectors of the undesired signals.

27. The method of claim 24 wherein the undesired signal is at least one of a noise signal and reception signals of undesired subscribers.

28. The method of claim 27, wherein the weighted vector determines a forward link gain by applying a direction component of an estimated reception angle of a desired subscriber.

29. The method of claim 28, wherein the reception angle may be estimated from a maximum value of the spatial spectrum.

30. A method of transmitting a signal from a base station, comprising:

estimating a reception angle of a received signal from a first subscriber;

determining a forward link Quality of Service (QoS) parameter for the first subscriber;

transmitting a transmission signal to the first subscriber by increasing a gain in a desired signal direction and decreasing a gain in an interference signal direction in accordance with the estimated reception angle and the forward link QoS parameter.

31. The method of claim 30, wherein increasing the gain results in a maximum gain, and wherein decreasing the gain results in a minimum gain.

32. The method of claim 30, wherein a weighted vector is calculated using the estimated reception angle and the forward link QoS parameter, and wherein the weighted vector is applied to the transmission signal to increase the gain in the desired direction and decrease the gain in the undesired direction.

33. The method of claim 32, wherein the weighted vector is calculated to an optimal value wherein the increase in gain results in a maximum gain, and wherein the decrease in gain results in a minimum gain.

* * * * *